United States Patent
Polcyn

(10) Patent No.: US 6,978,006 B1
(45) Date of Patent: Dec. 20, 2005

(54) RESOURCE MANAGEMENT UTILIZING QUANTIFIED RESOURCE ATTRIBUTES

(75) Inventor: Michael J. Polcyn, Allen, TX (US)

(73) Assignee: Intervoice Limited Partnership, Dallas, TX (US)

( * ) Notice: Subject to any disclaimer, the term of this patent is extended or adjusted under 35 U.S.C. 154(b) by 776 days.

(21) Appl. No.: 09/689,481

(22) Filed: Oct. 12, 2000

(51) Int. Cl.[7] ............................................. H04M 3/00
(52) U.S. Cl. ........................ 379/265.12; 379/265.05; 379/265.06; 379/265.07; 379/266.01; 704/260; 705/8; 707/1
(58) Field of Search ...................... 379/265.01–265.02, 379/265.05–265.07, 265.09, 265.12, 266.01; 704/260; 705/8; 707/1

(56) References Cited

U.S. PATENT DOCUMENTS

| | | | | |
|---|---|---|---|---|
| 5,179,643 | A | * | 1/1993 | Homma et al. ............. 345/440 |
| 5,206,903 | A | * | 4/1993 | Kohler et al. .......... 379/265.12 |
| 5,335,269 | A | * | 8/1994 | Steinlicht ............... 379/266.05 |
| 5,572,625 | A | * | 11/1996 | Raman et al. ............... 704/260 |
| 5,825,869 | A | * | 10/1998 | Brooks et al. ......... 379/265.12 |
| 6,044,355 | A | * | 3/2000 | Crockett et al. ................ 705/8 |
| 6,526,397 | B2 | * | 2/2003 | Chee et al. ..................... 707/1 |
| 6,560,330 | B2 | * | 5/2003 | Gabriel .................. 379/265.02 |
| 6,584,191 | B1 | * | 6/2003 | McPartlan et al. ..... 379/265.02 |
| 6,584,192 | B1 | * | 6/2003 | Agusta ................... 379/265.12 |
| 6,832,203 | B1 | * | 12/2004 | Villena et al. .................. 705/8 |

OTHER PUBLICATIONS

U.S. Appl. No. 09/330,258, filed Jun. 10, 1999, Ellis K. Cave.

* cited by examiner

Primary Examiner—Fan Tsang
Assistant Examiner—Md Shafiul Alam Elahee
(74) Attorney, Agent, or Firm—Fulbright & Jaworski LLP

(57) ABSTRACT

A system and method are disclosed which quantify one or more attributes of a finite number of resources for effective management of such resources. Quantifiable attributes possessed by a resource may include skills or functional capabilities possessed by the resources, as examples. A request for service by one or more of the resources is received, and at least one attribute desired by the request is quantified. Based at least in part on the quantified attributes of the resources and the quantified attributes desired by the request, at least one suitable resource for servicing the received request is determined. Most preferably, attributes of resources may be quantified along a scale, such as a scale of 0 to 100. For example, within a telephony call center, attributes possessed by agents, such as language skills or product knowledge may be quantified along such a scale. A request for service may be received, and the attributes of a resource desired by the request are quantified along such a scale. Suitable resources for servicing a request may be determined by evaluating the quantified attributes possessed by the resources and the quantified attributes desired by the request. Thus, "N" number of resource attributes may be quantified and plotted within an N-dimensional space. Additionally, attributes desired by a received request may be quantified and plotted within such N-dimensional space. The distance between the plotted resource attributes and the plotted requests may be calculated to determine at least one suitable resource for servicing the request.

71 Claims, 4 Drawing Sheets

| | ENGLISH | SPANISH | FRENCH |
|---|---|---|---|
| AGENT$_A$ | 1 | 1 | 1 |
| AGENT$_B$ | 0 | 0 | 1 |
| AGENT$_C$ | 1 | 1 | 0 |
1 = POSSESSES SKILL
0 = DOES NOT POSSESS SKILL
*FIG. 3*
*(PRIOR ART)*
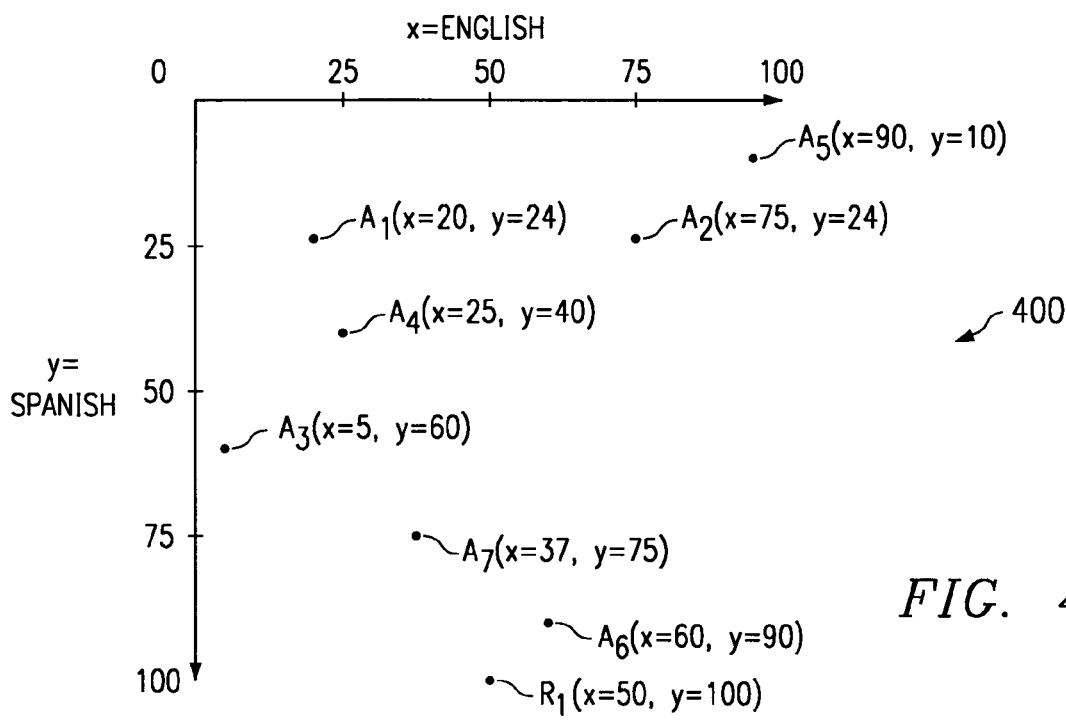
*FIG. 4A*
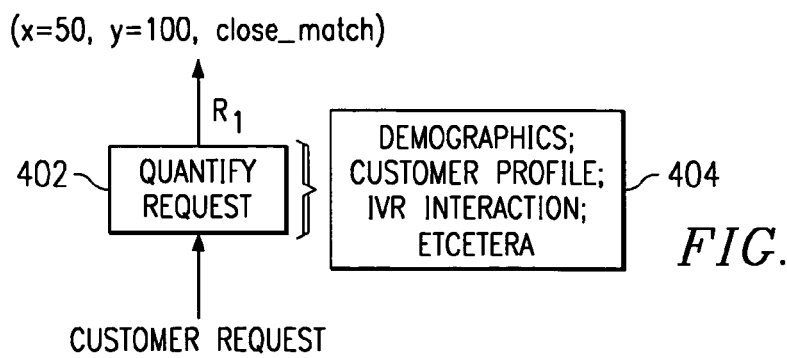
*FIG. 4B*

RESOURCE MANAGEMENT UTILIZING QUANTIFIED RESOURCE ATTRIBUTES

RELATED APPLICATIONS

This application is related to co-pending and commonly assigned U.S. patent application Ser. No. 09/330,258 filed Jun. 10, 1999, entitled "ALLOCATION OF MULTI-FUNCTION RESOURCES," the disclosure of which is hereby incorporated herein by reference.

TECHNICAL FIELD

This invention is related in general to resource allocation in, for example, call centers or other systems in which resources are allocated to service requests, and in particular to a system and method in which attributes of resources are quantified to enable more effective management of resources in servicing requests.

BACKGROUND

Resource management schemes are utilized for many types of systems in order to manage allocation of a limited number of resources to service requests for such resources. For example, resource management schemes may be utilized in allocating agents within a telephony call center to service telephone callers, allocating network or computer resources, such as memory and/or processing resources to requesting applications, or even allocating a limited number of tools within a toolbox to mechanics requesting such tools. All resources available within such a system typically do not have uniform attributes (or skill sets). For example, agents within in a telephony call center typically do not have uniform skill sets. For instance, each agent's knowledge of the products being serviced by the call center, sales skills, problem-solving skills, language skills, as well as many other quantifiable skills/attributes, vary from other agents.

Traditional resource management techniques do not attempt to quantify attributes of such resources. Rather, resources are typically identified in binary fashion as to various attributes. More specifically, resources are typically identified as either possessing a particular attribute or not possessing such attribute. For example, resource management schemes for call centers typically provide one or more "pools" of resources, wherein each pool includes a homogeneous collection of resources identified as possessing a particular attribute. For instance, one pool may be provided for agents capable of speaking English, another pool for agents capable of speaking Spanish, and still another pool for agents capable of speaking French. Thus, the resources are identified as either possessing English language skills, or not possessing such skills, possessing Spanish language skills, or not possessing such skills, and possessing French language skills or not possessing such skills, in order to compartmentalize each resource within a given pool. Thereafter, an automatic call distributor ("ACD"), for example, may be utilized to receive callers and route the callers to the appropriate pool of resources, e.g., depending on the language skill of the callers. The callers may be queued to await an available resource from the pool to which the caller is routed on a first come, first served basis, for example. Traditionally, the resources (e.g., agents) within a pool are allocated to a request (e.g., caller) based, for example, on which resource has been idle for the longest period of time.

Some resource management schemes utilized in the prior art allow for overflowing of requests from one pool to another pool. For example, a caller may first be routed to a pool of resources capable of speaking English, and if the caller is not serviced by that pool in a timely fashion, a request to service such caller may also be made to a pool of agents that are capable of speaking both English and Spanish. Furthermore, resource management schemes utilized in the prior art allow for individual agents to be assigned to multiple pools simultaneously. For instance, an agent capable of speaking both English and French may be assigned to both the pool of English speaking agents, as well as the pool of French speaking agents, and such agent may then be allocated by the resource manager to service callers that have been routed to either pool.

An example of one type of resource allocation scheme is disclosed in co-pending and commonly assigned U.S. patent application Ser. No. 09/330,258 filed Jun. 10, 1999, entitled "ALLOCATION OF MULTI-FUNCTION RESOURCES," the disclosure of which is hereby incorporated herein by reference. The disclosure of ALLOCATION OF MULTI-FUNCTION RESOURCES recognizes that multi-skilled or multi-talented resources exist, which have traditionally been ineffectively utilized in resource management schemes. Traditionally, such multi-skilled resources have been assigned to a heterogeneous pool along with other single and/or multi-skilled resources, for example. Much of the difficulty in the prior art in achieving effective utilization of resources stems from having to work around the inflexibility of serial requests in a unitary queue to a heterogeneous pool in which resources of varying skill sets are mixed together. Accordingly, ALLOCATION OF MULTI-FUNCTION RESOURCES discloses a resource management scheme whereby resources are compartmentalized into multiple homogeneous pools so that the resources in each pool are pure as to functional capability, and a delaying technique is utilized to prioritize requests made to the multiple homogeneous pools to optimize the management of the resources in those pools.

However, prior art resource management schemes utilize only a binary quantification of each skill/attribute for a resource, i.e., the resource is designated as either possessing the skill/attribute or not. For example, a pool of agents within a call center may exist for agents capable of speaking both English and Spanish. Each agent within the call center is either assigned to the pool or it is not. That is, each agent is designated as either possessing the capability of speaking both English and Spanish or not possessing such skill/attribute. However, prior art resource management schemes fail to quantify the skill level of each resource in a manner that more specifically details the extent to which each resource is capable of speaking each language, for example. As a result, resources may not be as effectively managed in prior art schemes, as is possible in a scheme which more specifically quantifies the skills/attributes of each resource. Additionally, prior art resource management schemes utilize only binary quantification of skills/attributes, which provides very limited information in terms of, for example, managing resources, deciding whether to add new resources and the type of new resources to add (e.g., hiring new agents within a call center or adding computer resources to a computer system), and/or decision-making as to upgrading/development of existing resources (e.g., training programs to implement for existing agents within a call center). That is, because the skills/attributes of resources are indicated in binary fashion as either being possessed by a resource or not being possessed by a resource, as opposed to a gradational, quantifiable assessment of such skills/attributes, prior art resource management schemes provide very limited information not only for allocating resources to requests but also for other management purposes. Accordingly, a desire exists in the art for a resource management scheme in which skills/attributes of resources are quantified in order to more effectively allocate such resources to service requests, as well as enable more effective tracking of skills/attributes of resources for a more informed overall management of such resources, e.g., to enable more informed decision-making regarding, as examples, recruiting/obtaining new resources, evaluating existing resources, and training/upgrading existing resources.

SUMMARY OF THE INVENTION

These and other objects, features and technical advantages are achieved by a system and method which quantify one or more attributes of a finite number of resources for effective management of such resources. For example, a preferred embodiment provides a resource management scheme for managing a finite number of resources for servicing request, in which at least one attribute of such resources is quantified. In a preferred embodiment, quantifiable attributes possessed by a resource may include skills or functional capabilities possessed by the resources. At least one request for service by one or more of the resources is received, and at least one attribute desired by the request is quantified. Based at least in part on the quantified attributes of the resources and the quantified attributes desired by the request, at least one suitable resource for servicing the received request is determined.

In a most preferred embodiment, the resource management scheme of the present invention is implemented within a telephony call center. For example, such a resource management scheme may be utilized to manage agents within a call center to allow for effective service to callers received by the call center. However, the resource management scheme of the present invention may be implemented within any type of environment to manage any type of finite resources in a manner for effectively servicing received requests. As one example, the resource management scheme of the present invention may be implemented within a computer system to manage computer resources, such as data input resources, data output resources, data storage resources, and data processing resources.

In a most preferred embodiment, any number of attributes of resources may be quantified along a scale, such as a scale of 0 to 100. For example, within a telephony call center, attributes possessed by agents, such as language skills, product knowledge, selling ability, or other attributes may be quantified along a scale of 0 to 100. For instance, an agent's ability to speak English may be quantified along a scale of 0 to 100, with 0 indicating no English skills and 100 indicating fluent English skills. Further attributes may be quantified in a similar manner. For instance, additional language skills, such as the ability to speak Spanish, French, and German, may each be quantified along a scale for an agent. A request for service from a resource may be received, and in a most preferred embodiment the attributes of a resource desired by the request are quantified. Accordingly, a received request may be quantified along a scale of 0 to 100, for example, according to the attributes of a resource desired by the request. Suitable resources for servicing a request may be determined by evaluating the quantified attributes possessed by the resources and the quantified attributes desired by the request.

In a most preferred embodiment, "N" number of attributes of a resource may be quantified and plotted within an N-dimensional space. Additionally, attributes desired by a received request may be quantified and plotted within such N-dimensional space. The distance between the quantified "N" number of attributes of the resources and the quantified attributes desired by the request may be calculated to determine at least one suitable resource for servicing the request. For example, resources plotted within a particular distance from the plotted request may be determined as suitable for servicing the request. For illustrative purposes, suppose the resource management scheme is implemented within a telephony call center to manage agents to effectively service callers to the telephony call center. The English language skills of each agent may be quantified along a scale of 0 to 100, for example, with 0 indicating no English skills and 100 indicating fluent English skills. Additionally, knowledge of various products possessed by each agent may be similarly quantified. For instance, knowledge of products A, B, and C may be quantified for each agent along a scale of 0 to 100, with 0 indicating no knowledge of the product and 100 indicating great knowledge of the product. Thus, based on the quantifiable values of each attribute possessed by the agents (i.e., the English language skills, and knowledge of product A, B and C), each agent may be plotted within a hypothetical four-dimensional skill space. A request may then be received from a caller to the call center desiring to speak with an agent fluent in English and possessing great knowledge of product B, for example. Such a request may be plotted within the N-dimensional space based on the desired attributes of an agent for servicing the request. In a preferred embodiment, resources plotted most closely to the plotted request may be allocated for servicing the request.

Accordingly, in a preferred embodiment, quantification of resource attributes may be utilized to enable more effective allocation of resources in servicing requests. Additionally, such quantification of resource attributes may provide further advantages in the management of such resources. As one example, over a period of time, the types of requests received by a system may be better understood. That is, the types of resource attributes commonly desired by requests may be more accurately defined. Therefore, the resources may be managed in an appropriate way to better service the most common types of requests received. As a further example, because the attributes of the resources are quantified, such quantification provides a useful development tool. For instance, various types of reports and statistics on the resources may be generated based on such quantification of attributes to aid in adding further resources (e.g., defining hiring profiles to better match the work force to the types of requests commonly received) or training programs for the existing resources, as examples.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 3 shows an exemplary chart (or "matrix") that identifies the skills/attributes of agents within a telephony call center of the prior art;

FIG. 4A shows an exemplary two-dimensional skill space in which two quantifiable skills/attributes of resources may be plotted;

FIG. 4B shows an exemplary flow diagram for quantifying skills/attributes of a resource desired by a received request in accordance with a preferred embodiment;

DETAILED DESCRIPTION

A most preferred embodiment of the present invention is implemented within a telephony call center for allocating resources of the call center (e.g., agents) to service requests (e.g., received calls). It should be recognized that such a call center may be an inbound call center that primarily receives and services inbound calls, an outbound call center that primarily places outbound calls to provide a service, or a hybrid that services both inbound and outbound calls. It should be further recognized that the present invention has a much broader application than only within a call center. That is, the resource management scheme disclosed herein may be utilized for any type of system/environment in which it is desirable to allocate a limited number of resources to requests in order to service such requests. Thus, many other environments may exist in which a limited number of resources are to be managed to allow for effective allocation of such resources to service requests, and any such environment is intended to be within the scope of the present invention. Accordingly, the present invention is not intended to be limited only to the environments provided herein, such as call centers, but rather such environments are intended solely as examples that render the disclosure enabling for many other environments in which resource management is desirable.

Figure 1:
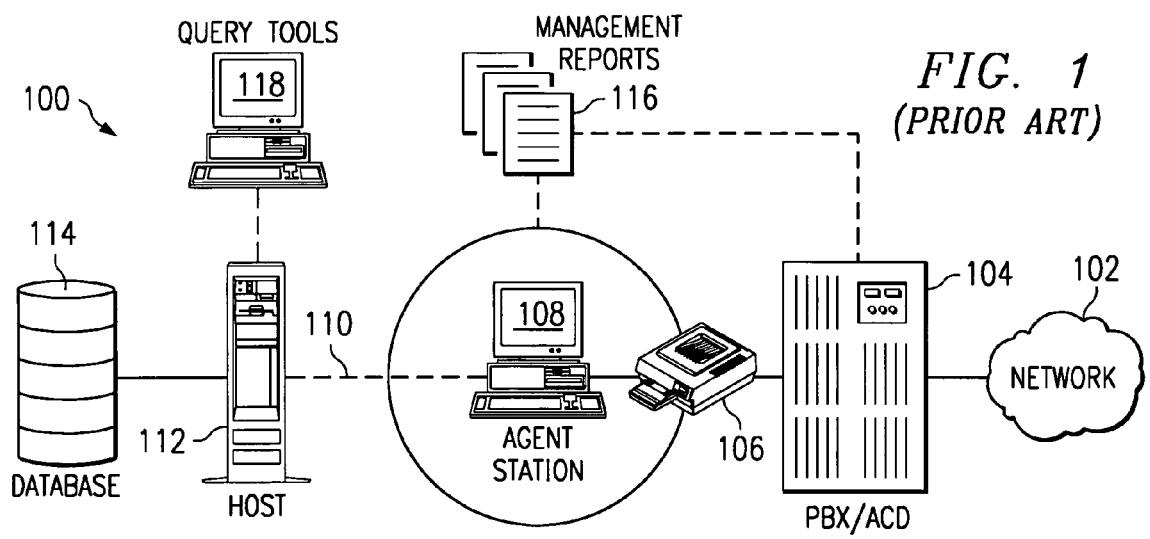
FIG. 1 shows an exemplary implementation of a typical call center environment in which a resource management scheme of the present invention may be implemented.

A call center environment is utilized herein as an exemplary environment in which resource management is desirable. FIG. 1 provides an exemplary implementation of a typical call center environment 100 in which a resource management scheme of the present invention may be implemented. In general, call centers are specialized environments that are equipped, staffed, and managed to handle a large volume of incoming and/or outgoing telephone calls. Telephone calls are typically received by a call center from callers over Network 102, which may be a public switched telephone network (PSTN), the Internet, or any other type of network over which telephony information may be communicated. Call centers typically use digital lines such as 56 kbps, fractional T1 or T1, and Integrated Services Digital Network ("ISDN").

A call center typically includes a switching system 104, which most often is a stand-alone ACD or integrated ACD/PBX system to support call center operations. ACD functions can be provided by the telephone company's central office, however, or as part of the carrier's Centrex services, for example. An ACD/PBX 104 is typically utilized to connect received calls to an order taker, customer service representative, help desk operator, or some other type of agent. One or more of such agents are typically provided for servicing calls. The agents may operate from a single location, or they may be distributed around the world. In some cases, calls may be automatically transferred across time zones so the organization can provide customers with 24-hour service, for example. Each agent typically has an agent station that includes a telephone 106 and a computer workstation 108. Thus, when the agent is available to service a received call, PBX/ACD 104 may route the call to the agent's telephone 106, and the agent may enter information about the call on computer workstation 108. In some implementations, information about the caller may be provided on the agent's computer workstation 108 as the call is transferred to the agent's telephone 106. For example, an interactive voice response unit ("IVRU") may initially interact with a caller to obtain information, such as the caller's account number, and then as the call is transferred to telephone 106, the caller's account information may be displayed for the agent on computer workstation 108. Calls that cannot be answered immediately are typically put in a queue to be held until the next agent becomes available. While on hold, callers may be presented music, advertising, and/or periodic barge-in messages informing them of their queue status.

When the call is answered/serviced by an agent, the agent addresses the callers needs and may enter relevant information about the caller into computer workstation 108 which may be communicatively coupled to a host computer 112 via, as examples, a direct PC to PC connection, a local area network (LAN), a wide area network (WAN), modem to modem connection, the Internet, an Intranet, or any combination thereof suitable for providing information communication therebetween. The information may be stored in a database 114, and it may be referred to later, such as upon a subsequent call to/from the caller. In addition, such information may be used for a variety of other purposes, including the preparation of shipping labels for ordered merchandise, follow-up sales calls, direct mail advertising, and consumer surveys.

Typically, the host computer 112 can sort the stored records of information in any number of ways and generate appropriate reports. Thus, call centers typically include management information tools that may enable a manager to use computer terminal 118, for example, to query the database 114 and retrieve information to reveal such things as new sales opportunities, levels of customer satisfaction, and call center performance. Additionally, resource management tools are also typically provided to enable a manager to generate management reports 116, for example, to reveal such things as caller hold time, number of dropped calls (i.e., callers unwilling to wait the required hold time), agent efficiency (e.g., the amount of time each agent spends servicing each call and the total number of calls serviced by each agent), and agent utilization (e.g., the amount of time that one or more agent's are idle).

Figure 2:
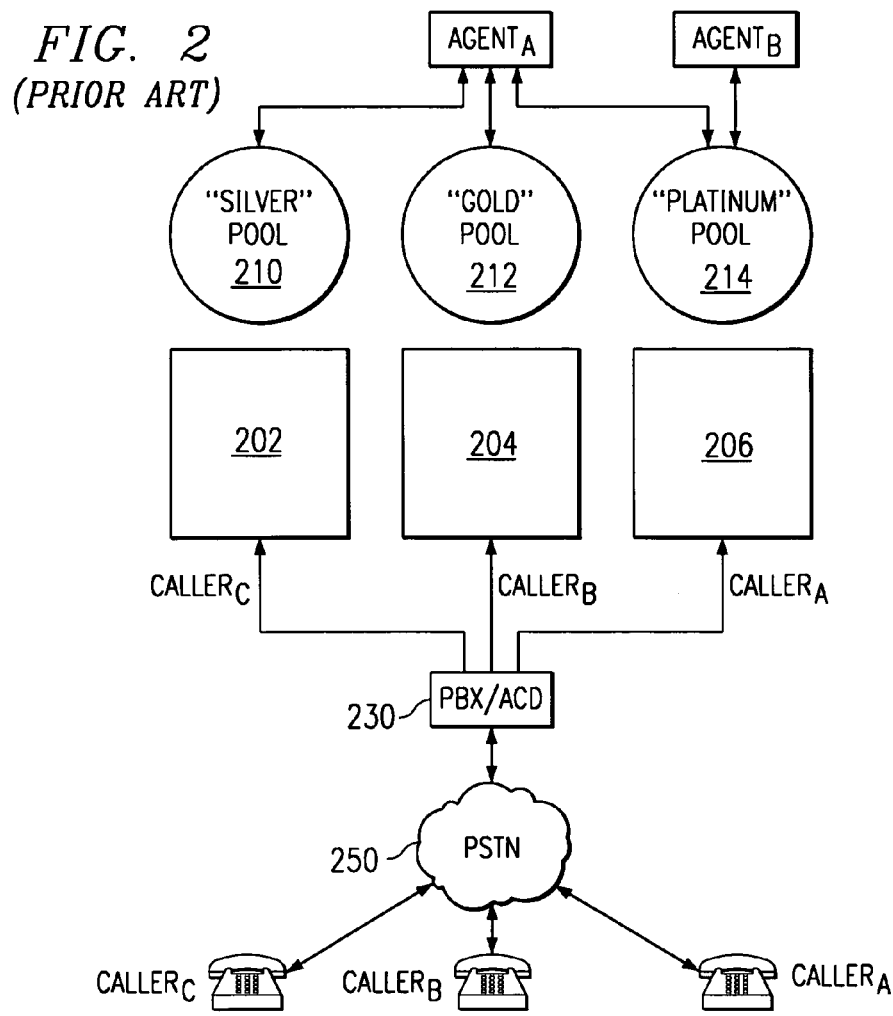
FIG. 2 shows a traditional resource management scheme for a call center of the prior art.

Turning now to FIG. 2, a traditional resource management scheme for a call center 200 of the prior art is shown, in which agents logon to one or more pools for receiving calls routed to such Pools. In the exemplary implementation of FIG. 2, agents may logon to (or otherwise be assigned to) one or more of three "pools," shown as pools 210, 212, and 214. For example, $Agent_A$ of FIG. 2 may be logged on to all three of pools 210, 212, and 214, while $Agent_B$ may be logged on to only pool 214. Each pool 210, 212, and 214 has a queue for holding callers awaiting an agent from such pool. For example, pool 210 has an associated queue 202, pool 212 has an associated queue 204, and pool 214 has an associated queue 206. Thus, for instance, a call waiting to be serviced by an agent from pool 210 is held in queue 202. Such queues 202, 204, and 206 are typically First In, First Out ("FIFO") queues, which assign agents from the respective pools to service holding calls in the order in which they are queued for such pool. Callers may place a telephone call to the call center 200 via, for example, public switched telephone network (PSTN) 250. Upon receiving a call in call center 200, PBX/ACD 230 may receive information about the call and route the call to the appropriate pool 210, 212, or 214, wherein the routed call may be held in the pool's respective queue for service by an agent logged on to such queue. For example, PBX/ACD 230 may utilize an IVRU for prompting the caller for information, which may be received for instance in the form of dual tone multi-frequency (DTMF) signals or verbal commands recognized by a voice recognition unit, and/or PBX/ACD 230 may have caller identification capability utilizing Automatic Number Identification (ANI) in order to determine the appropriate pool to which the call should be routed.

In such a prior art implementation, each agent is assigned (or logged on) to one or more of such pools. The pools may be utilized to compartmentalize the agents based, for example, on the agents' skill sets. For example, pool 210 may be an English speaking pool, pool 212 may be a Spanish speaking pool, and pool 214 may be a French speaking pool. For instance, $Agent_A$ may be assigned to all three pools if it is determined that $Agent_A$ possesses adequate language skills in each of English, Spanish and French, while $Agent_B$ may be assigned only to the French speaking pool 214 based upon such agent's language skills. As can be seen, each agent's skill sets are quantified simply in a binary fashion, i.e., either the agent possesses the skills necessary to be included within a certain pool or the agent does not. There is no further quantification of the agents' skills, which may indicate, for example, the extent of an agent's language skills in each language.

As a further example, which is shown in FIG. 2, pool 214 may be designated a "Platinum" pool, to which callers identified as "Platinum" customers are routed by PBX/ACD 230. Pool 212 may be designated a "Gold" pool, to which callers identified as "Gold" customers are routed by PBX/ACD 230, and Pool 210 may be designated a "Silver" pool, to which its corresponding customers are routed by PBX/ACD 230. For instance, $Caller_A$ may be identified as being a "Platinum" customer, whereby PBX/ACD 230 routes $Caller_A$ to queue 206 to be serviced by agents assigned to "Platinum" pool 214. Similarly, $Caller_B$ may be identified as being a "Gold" customer, whereby PBX/ACD 230 routes $Caller_B$ to queue 204 to be serviced by agents assigned to "Gold" pool 212, and $Caller_C$ may be identified as being a "Silver" customer, whereby PBX/ACD 230 routes $Caller_C$ to queue 202 to be serviced by agents assigned to "Silver" pool 214.

Typically, calls holding in each queue are serviced by their respective pools in the order queued. Thus, for example, the most skilled agents may be assigned to the "Platinum" pool 214 to service the customers routed to that pool, while less skilled agents are assigned to the "Gold" pool 212 and the least skilled agents are assigned to the "Silver" pool 210. Of course, each queue may have a particular time threshold, after which callers in that queue may also be queued for a different queue. For example, queue 206 may be implemented with a particular time threshold, wherein if a customer has been on hold more than such time threshold (e.g., a minute), such customer is also queued for less skilled agents that are logged on to Queue 212, in order to expedite the service of that call. Thus, the call center's PBX/ACD 230 may be implemented in some fashion other than a pure FIFO, whereby after a particular time threshold a call may be pending in multiple queues simultaneously or be raised in priority.

In prior art resource management schemes, the skills/attributes of resources are typically identified in a binary fashion. For example, turning to FIG. 3, an exemplary chart 302 (or "matrix") that identifies the skills/attributes of agents within a call center of the prior art is provided. Chart 302 may be implemented, for example, as a database or any type of lookup table. Chart 302 includes a list of agents, $Agent_A$, $Agent_B$, and $Agent_C$, and identifies whether each agent possesses the certain skills, shown as English, Spanish, and French language skills. More specifically chart 302 is a binary chart, wherein "1" indicates that the agent possesses the corresponding skill and "0" indicates that the agent does not possess the corresponding skill. For example, $Agent_A$ is identified as possessing the capability to speak English, Spanish and French languages. $Agent_B$ is identified as only possessing the capability to speak French, and $Agent_C$ is identified as possessing the capability to speak English and Spanish but not French. Accordingly, $Agent_A$ may be assigned to an English speaking pool, Spanish speaking pool, or French speaking pool of agents, while $Agent_B$ may only be assigned to the French speaking pool of agents. Thus, prior art resource management schemes utilize a binary assessment of skills possessed by resources, as opposed to a gradational, quantifiable assessment of the skills possessed by each resource.

A preferred embodiment of the present invention quantifies (or "measures") resource skills/attributes to enable better management of such resources. For example, a more intelligent allocation of resources to requests may be made when taking into account the extent of each resource's skills/attributes. As used with reference to the present invention herein, "quantifying" resource skills/attributes is intended to mean any type of quantification of resources beyond mere binary quantification described above. Turning to FIGS. 4A and 4B, an exemplary implementation of a preferred embodiment of the present invention is shown. FIG. 4A illustrates a two-dimensional skill space 400, having X and Y coordinates. The X axis may represent a first quantifiable skill/attribute and the Y axis may represent a second quantifiable skill/attribute. In the exemplary implementation of FIG. 4A, the X axis represents English language skills and the Y axis represents Spanish language skills, wherein 0 on each axis indicates no language capability and 100 on each axis indicates fluent language capability. Thus a resource's skills in each language may be quantified on a scale of 0 to 100, for example, the skills/attributes of resources (e.g., call center agents) are measured/quantified and then plotted within the two-dimensional space according to their respective skills/attributes.

As shown in FIG. 4A, seven agents, $A_1$–$A_7$, are plotted according to their quantified skills/attributes within the two-dimensional space. In other words, each agent is assigned an X and Y value that indicates the agent's X and Y skills/attributes (e.g., English and Spanish language skills). The value assigned for the skill sets of each agent may be determined in a variety of ways. For example, each agent may be tested and the values may be assigned based in whole or in part on the test results. Furthermore, each agent's education level may be utilized in whole or in part to assign values to the agents. Also, each agent's experience level may be utilized in whole or in part to assign values to the agents. Past performance by the agent may be utilized in whole or in part to assign values to the agents. Of course, many other criteria may be utilized to measure each agent's skills/attributes, and any method for determining/assigning values for each agent's skills/attributes utilized is intended to be within the scope of the present invention. Furthermore, it should be recognized that the assigned skill level values need not be static, but may be changed periodically (e.g., as the resource's skill level improves). In fact, the resource management scheme may be implemented to continually track resource performance and update the resources' skill level values substantially in real-time.

In the exemplary implementation shown in FIG. 4A, agent $A_1$ has been assigned a skill level value of (X=20, Y=24). That is, agent $A_1$ is plotted within the two-dimensional skill space to the point (X=20, Y=24). Similarly, agent $A_2$ has been assigned a skill level value of (X=75, Y=24). Thus, agent $A_2$ has equivalent Spanish speaking capabilities as agent $A_1$, but agent $A_2$ speaks English much more fluently than agent $A_1$. Agent $A_3$ has been assigned a skill level value of (X=5, Y=60). Agent $A_4$ has been assigned a skill level value of (X=25, Y=40). Agent $A_5$ has been assigned a skill level value of (X=90, Y=10). Agent $A_6$ has been assigned a skill level value of (X=60, Y=90), and agent $A_7$ has been assigned a skill level value of (X=37, Y=75).

A request, $R_1$, requesting service from a resource is also shown in the exemplary two-dimensional skill space 400. The request $R_1$ is plotted to the point (X=50, Y=100) within the skill space 400. The request may be assigned a value within the skill space 400 in any of a variety of ways. For example, as shown in FIG. 4B, in a preferred embodiment a customer request is received (e.g., within a call center), and the customer request is then quantified, shown in block 402, to better determine the selection of the resource most appropriate for servicing the request. The customer request may be quantified in block 402 by utilizing any number of techniques, examples of which are shown in block 404, including but not limited to demographics, a customer profile, IVR interaction with the customer, and/or many other techniques appropriate for obtaining data for quantifying the customer's request. As an example, IVR interaction may be utilized to prompt the customer to provide yes/no responses, or other types of responses. For instance, the IVR may prompt the customer to enter the customer's age, zip code, and other information. Thereafter, demographic techniques may be applied to translate each of the received responses (e.g., the received zip code and the received age) into a value. As one example, particular agents within a call center may be plotted as best suited for customer's over a particular age (e.g., over 40) and other agents may be plotted as being more suited for customer's below 40, etcetera. Rather than IVR interaction, other type of interaction with a customer may be utilized to receive information. For example, the customer may provide information via a web site over the Internet. For instance, the customer may enter data into a web-based interface, and the resource management system may then utilize such information to quantify the particular agent that the customer wants to talk to.

The quantification process of block 402 results in a customer request $R_1$ having a quantified value within the two-dimensional space 400. In other words, request $R_1$ may have a quantified value that indicates the ideal (or most satisfactory) skills to be possessed by a resource in order to service the request $R_1$. Thus, the value assigned to request $R_1$ may not accurately reflect the skill level of the requesting customer within the skill space 400, but it preferably reflects the desired skill level of a resource for servicing the customer's request. For example, upon receiving a call from a customer within a call center, an IVRU may be utilized to obtain information identifying the customer, such as an account number and/or personal identification number (PIN). Thereafter, a database containing a profile for the customer may be accessed, which details the customer's preferences. Based on the customer's preferences, the request $R_1$ may be assigned a value (X=50, Y=100). Of course, the customer may be capable of speaking English (indicated by the X value) just as fluently as Spanish (indicated by the Y value), but may have a higher value assigned for Spanish because of the customer's preference to speak Spanish.

As further shown in FIG. 4B, the quantification of the customer request may further include a "close_match" modifier, which indicates the acceptable range or variance of resource skill values that are close enough to the target skill values desired by request $R_1$. For instance, the close_match modifier may be a variable that indicates the closeness of a resource's skill value to the target value specified by request $R_1$ that is acceptable for satisfying the customer's request. Such close_match modifier may be based, for example, on the customer's preferences indicated within the customer's profile. For instance, the customer's profile may indicate that the customer "strongly" prefers to speak in Spanish, in which case the close_match variable may indicate that only a relatively small variance from the target skill value is acceptable. However, the customer's profile may indicate that the customer "mildly" prefers to speak in Spanish, in which case the close_match variable may indicate a relatively larger variance from the target skill value as being acceptable. Of course, the close_match variable may be set to a value by the resource manager, in an attempt to allocate the resources in a manner to achieve a desired performance. For instance, if the call center is extremely busy (e.g., receiving a high volume of incoming calls), the resource manager may set the close_match value to accept a relatively larger variance from the target skill value in order to service customer's requests in a more timely fashion. On the other hand, when the call center is less busy, the resource manager may set the close_match value to accept a relatively smaller variance from the target skill in order to service the customer's requests in accordance with the customer's preferences. The close_match variable may automatically change in response to the performance of the call center. For example, the resource manager may specify that the close_match variable be one value when the hold time for calls is less than one minute and be another value when the hold time for calls is one minute or more.

Once request $R_1$ is plotted, the closest resource to the target skill value requested by request $R_1$ is determined. For instance, a distance measurement is made to determine the most appropriate resource for satisfying the request. Mathematical techniques for measuring the distance between the target skill level plotted for request $R_1$ and the plotted agent skill levels within a skill space 400 are well known. Using such well known mathematical techniques it may be determined, for example, that agent $A_6$ is the closest match to the target skill level requested by request $R_1$. It may also be determined that agent $A_7$ is the next closest match, followed by agents $A_3$, $A_4$, $A_2$, $A_1$, and then $A_5$, in order. In one, exemplary embodiment, the resource is selected from the nearest available resources. In another exemplary embodiment, all acceptable resources are determined and the first of such resources to become available is assigned to service request $R_1$.

Furthermore, each request, such as request $R_1$, may include a time modifier, such that as the amount of time that the request is holding for a resource, the close_match variable may be adjusted to expand the acceptable range of resource skill values. For example, it may initially be determined based on the target values specified by request $R_1$ and its associated close_match variable that resources $A_6$ and $A_7$ are for servicing request $R_1$. Assuming that resources $A_6$ and $A_7$ are unavailable (e.g., busy servicing another request), request $R_1$ may hold for a certain amount of time (e.g., a "threshold" amount of time), after which if request $R_1$ remains unserviced, the close_match modifier may be enlarged to include resources $A_3$ and $A_4$ as suitable for servicing request $R_1$. Thus, the range of suitable resources for servicing a request may vary over time in order to try to service such a request in a more timely manner.

Figure 5A:
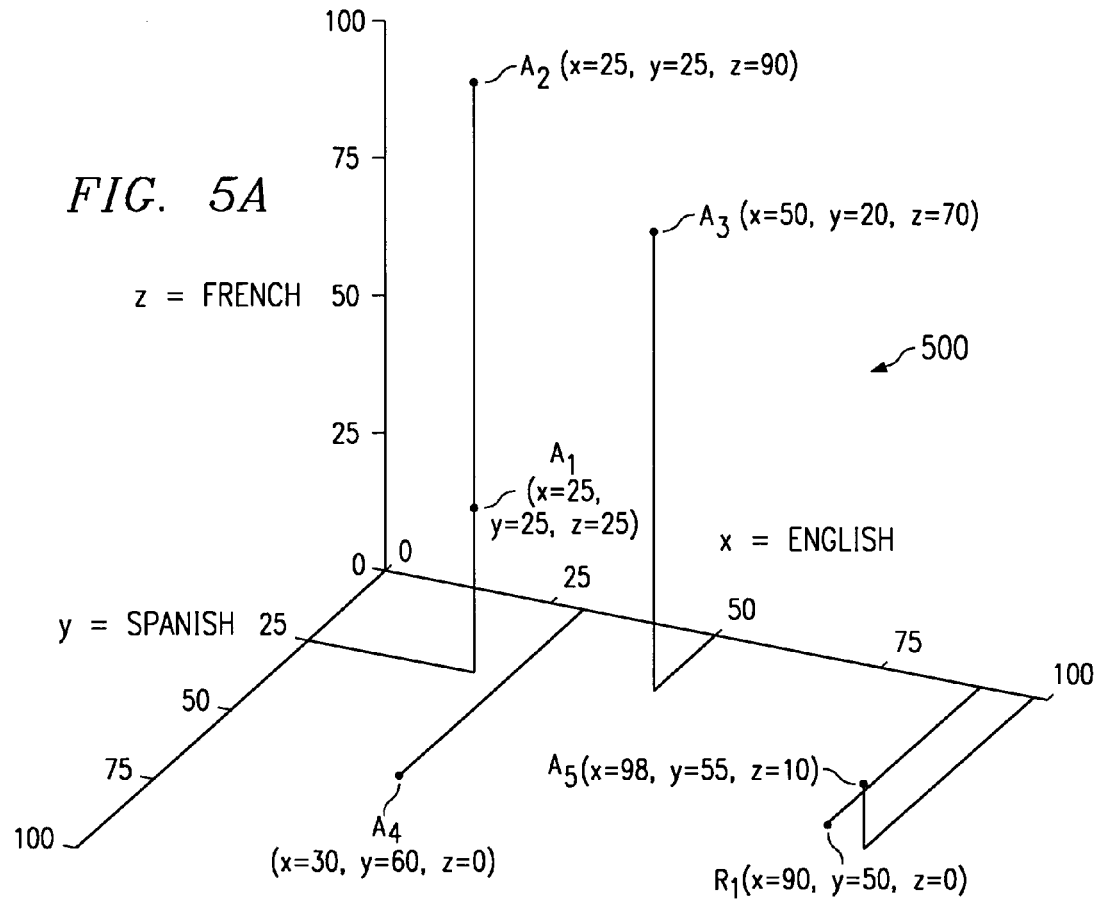
FIG. 5A shows an exemplary three-dimensional skill space in which three quantifiable skills/attributes of resources may be plotted.
Figure 5B:
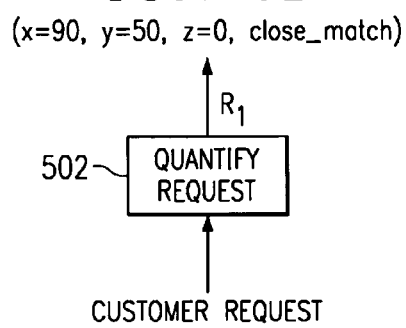
FIG. 5B shows an exemplary flow diagram for quantifying skills/attributes of a resource desired by a received request in accordance with a preferred embodiment.

It should be recognized that the principals of the resource management scheme of the present invention may be extended to any number "N" of dimensions (i.e., N-dimensions). Thus, the present invention is not limited solely to a two-dimension space 400 as shown in FIG. 4, but may be implemented for N-dimension space to enable N skills/attributes of resources to be quantified within such N-dimension space. Furthermore, each skill/attribute may be quantified on any scale, and need not be quantified solely on a scale of 0 to 100 as provided in the exemplary implementations herein. Turning to FIGS. 5A and 5B, an exemplary implementation of a preferred embodiment is shown as implemented within three-dimensional space 500. More specifically, FIG. 5A illustrates a three-dimensional skill space 500, having X, Y and Z coordinates. The X axis may represent a first quantifiable skill/attribute, the Y axis may represent a second quantifiable skill/attribute, and the Z axis may represent yet a third quantifiable skill/attribute. In the exemplary implementation of FIG. 5A, the X axis represents English language skills, the Y axis represents Spanish language skills, and the Z axis represents French language skills, wherein 0 on each axis indicates no language capability and 100 on each axis indicates fluent language capability. The skills/attributes of resources (e.g., call center agents) are measured/quantified and then plotted within the three-dimensional space according to their respective skills/attributes.

As shown in FIG. 5A, five agents, $A_1$–$A_5$, are plotted according to their quantified skills/attributes within the three-dimensional space. In other words, each agent is assigned an X, Y and Z value that indicates the agent's X, Y and Z skills/attributes (e.g., English, Spanish and French language skills). As discussed in conjunction with FIG. 4A above, the value assigned for the skill sets of each agent may be determined in a variety of ways, such as through agent testing or past performance. As further discussed above, the assigned skill level values need not be static, but may be changed periodically (e.g., as the resource's skill level improves).

In the exemplary implementation shown in FIG. 5A, agent $A_1$ has been assigned a skill level value of (X=25, Y=25, Z=25). That is, agent $A_1$ is plotted within the three-dimensional skill space 500 to the point (X=25, Y=25, Z=25). Similarly, agent $A_2$ has been assigned a skill level value of (X=25, Y=25, Z=90). Thus, agent $A_2$ has equivalent English and Spanish speaking capabilities as agent $A_1$, but agent $A_2$ speaks French much more fluently than agent $A_1$. Agent $A_3$ has been assigned a skill level value of (X=50, Y=20, Z=70). Agent $A_4$ has been assigned a skill level value of (X=30, Y=60, Z=0), and agent $A_5$ has been assigned a skill level value of (X=98, Y=55, Z=10).

A request, $R_1$, requesting service from a resource is also shown in the exemplary three-dimensional skill space 500. Based on the resource attributes/skills desired by the request, request $R_1$ is plotted to the target point (X=90, Y=50, Z=0) within the skill space 500. As shown in FIG. 5B, in a preferred embodiment a customer request is received (e.g., within a call center), and the customer request is then quantified, shown in block 502, to better determine the selection of the resource most appropriate for servicing the request. As described in conjunction with FIG. 4B, the customer request may be quantified in block 502 by utilizing any number of techniques, examples of which include but are not limited to demographics, a customer profile, IVR interaction with the customer, and/or many other techniques appropriate for obtaining data for quantifying the customer's request. The quantification process of block 502 results in a customer request $R_1$ having a quantified, target value within the three-dimensional space 500. In other words, request $R_1$ may have a quantified value that indicates the ideal (or most satisfactory) skills to be possessed by a resource in order to service the request $R_1$. Thus, as described above, the value assigned to request $R_1$ may not accurately reflect the skill level of the requesting customer within the skill space 500, but it preferably reflects the desired skill level of a resource for servicing the customer's request. As further shown in FIG. 5B, the quantification of the customer request may further include a "close_match" modifier, which indicates the acceptable range or variance of resource skill values that are close enough to the target skill values desired by request $R_1$, as discussed above in conjunction with FIGS. 4A and 4B.

Once request $R_1$ is plotted, the closest resource to the target skill value requested by request $R_1$ is determined. For instance, a distance measurement is made to determine the most appropriate resource for satisfying the request. Using well known mathematical techniques it may be determined, for example, that agent $A_5$ is the closest match to the target skill level requested by request $R_1$. It may also be determined that agent $A_4$ is the next closest match, followed by agents $A_3$, $A_1$, and then $A_2$, in order.

Figure 6:
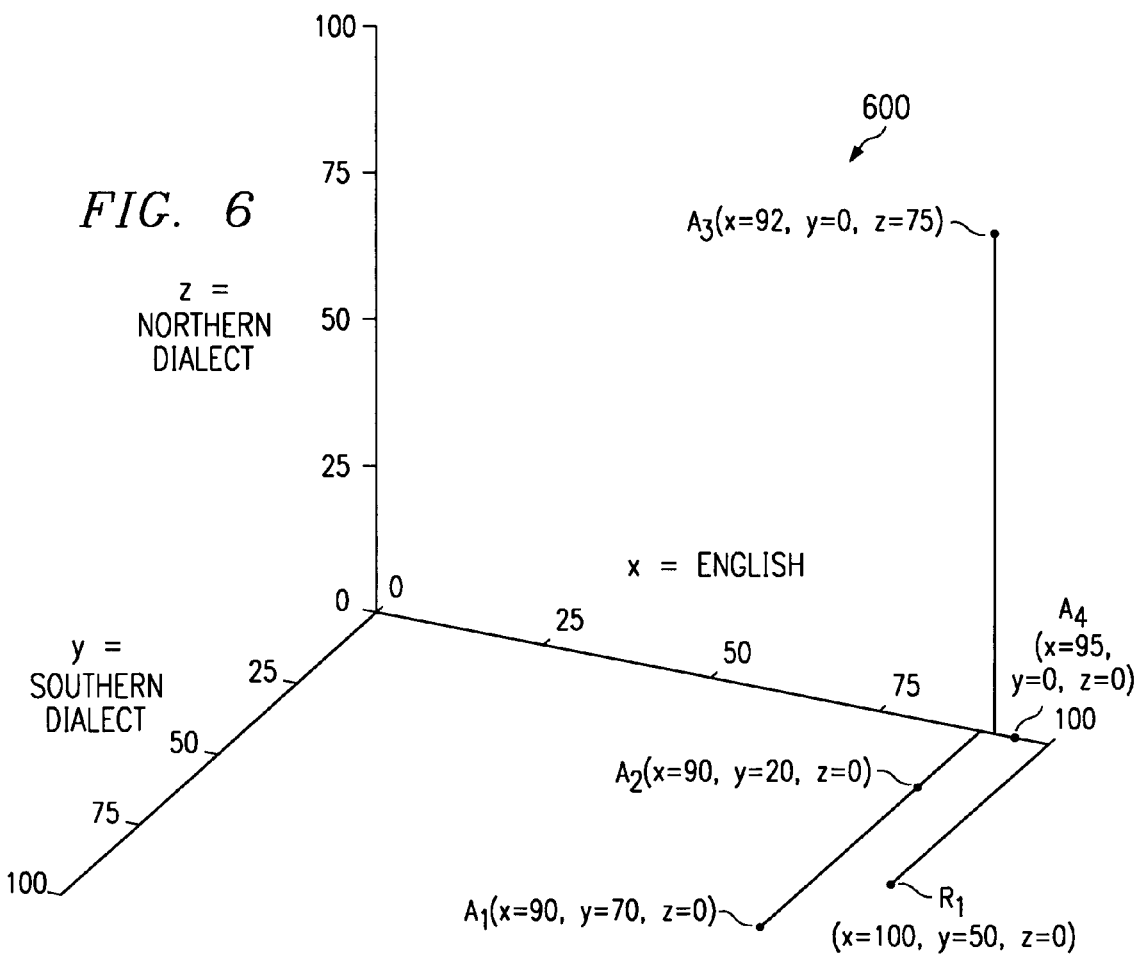
FIG. 6 shows a further exemplary three-dimensional skill space in which three quantifiable skills/attributes of resources may be plotted.

Another example of such a three-dimensioned space is shown in FIG. 6. FIG. 6 illustrates a three-dimensional skill space 600, having X, Y and Z coordinates. In this implementation, the X axis represents overall English language skills, wherein 0 on the axis indicates no English capability and 100 indicates fluent language capability. The Y axis represents a southern dialect (or southern accent) and the Z axis represents a northern dialect (or northern accent), wherein 0 on each axis indicates no dialect and 100 on each axis indicates a strong dialect. The skills/attributes of resources (e.g., call center agents) are measured/quantified and then plotted within the three-dimensional space according to their respective skills/attributes. As shown in FIG. 6, four agents, $A_1$–$A_4$, are plotted according to their quantified skills/attributes within the three-dimensional space. In other words, each agent is assigned an X, Y and Z value that indicates the agent's X, Y and Z skills/attributes (e.g., English capability, southern dialect, and northern dialect). As discussed in conjunction with FIGS. 4A and 5A above, the value assigned for the skill sets of each agent may be determined in a variety of ways, such as through agent testing or past performance. As further discussed above, the assigned skill level values need not be static, but may be changed periodically (e.g., as the resource's skill level improves).

In the exemplary implementation shown in FIG. 6, agent $A_1$ has been assigned a skill level value of (X=90, Y=70, Z=0). That is, agent $A_1$ is plotted within the three-dimensional skill space 600 to the point (X=90, Y=70, Z=0). Accordingly, agent $A_1$ possesses relatively fluent English capability and also possesses a relatively strong southern dialect. Similarly, agent $A_2$ has been assigned a skill level value of (X=90, Y=20, Z=0). Thus, agent $A_2$ has equivalent English capability as agent $A_1$, but agent $A_2$ possesses a much weaker southern dialect than agent $A_1$. Agent $A_3$ has been assigned a skill level value of (X=92, Y=0, Z=75). Thus, agent $A_3$ possesses relatively fluent English capability and also possesses a relatively strong northern dialect. Agent $A_4$ has been assigned a skill level value of (X=95, Y=0, Z=0). Thus, agent $A_4$ possesses relatively fluent English capability and possesses no (or relatively weak) southern and northern dialects.

A request, $R_1$, requesting service from a resource is also shown in the exemplary three-dimensional skill space 600. Based on the resource attributes/skills desired by the request, request $R_1$ is plotted to the target point (X=100, Y=50, Z=0) within the skill space 600. For instance, request $R_1$ may be a request from a customer desiring to speak with an agent that speaks English very fluently and possesses a relatively mild southern dialect. Once request $R_1$ is plotted, the closest resource to the target skill value requested by request $R_1$ is determined. For instance, a distance measurement is made to determine the most appropriate resource for satisfying the request. Using well known mathematical techniques it may be determined, for example, that agent $A_1$ is the closest match to the target skill level requested by request $R_1$. It may also be determined that agent $A_2$ is the next closest match, followed by agents $A_4$ and then $A_3$, in order.

As discussed above, the mathematical techniques for determining the distance between two points plotted within N-dimensional space are well known. As the number of dimensions increases, the mathematics required may become more intensive, but the mathematical techniques for performing such calculations are well known and may be implemented within an algorithm (e.g., within a computer software program). In fact, such gradational or quantification evaluations have been implemented within systems of the prior art to perform functions other than resource management. Examples of such mathematical techniques include "Markov" or "hidden Markov" modeling techniques, which have been applied within prior art voice recognition systems to determine, for example, the closeness between the pattern of a spoken word with the pattern of a known word to perform voice recognition. More specifically, in voice recognition systems of the prior art, utterances may be quantified based on, for instance, length, pitch, and frequency of such utterances. Each of these quantifications may translate into vectors, and such vectors will converge for a particular word on an area within an N-dimensional space. Such N-dimensional space may be indoctrinated with, for example, 500 speakers uttering words such as "yes" and "no." Thus, particular measurements or volumes exist within the N-dimensional space, such as one volume representing the plotted values for "yes" and another volume representing the plotted values for "no." When an unknown utterance is received by the voice recognition system, it may be quantified based on the same vectors or attributes, and then plotted within the N-dimensional space to enable a distance measurement to be obtained in order to determine which of the known utterance volumes is the closest match to the unknown utterance.

Because voice recognition systems deal with many variations between speakers, such a quantification within N-dimensional space, wherein N is the number of attributes quantified for an utterance (e.g., pitch, frequency, etcetera), is a much more effective technique for pattern recognition than a binary technique. If voice could be quantified in binary terms, e.g., if everyone had a very uniform way of speaking without various dialects, noise factors, or other variations existing, then voice recognition systems could possibly apply binary techniques for voice recognition. However, because there is so much variance in spoken words that need to be accounted for within an effective voice recognition system, volumes representing the variations within an N-dimensional space are typically utilized. Thus, a form of "fuzzy" logic may be utilized to recognize a received utterance. Similarly, a similar form of "fuzzy" logic may be utilized in accordance with a preferred embodiment of the present invention to allocate a resource within an N-dimensional space to a request, utilizing known mathematical techniques.

Mathematical techniques for performing shape analysis are also well known, which may be implemented to evaluate the plotted resource skills/attributes and received requests. For example, there are techniques in Eigen space mathematics that are utilized in performing shape analysis, which may be utilized in evaluating the plotted resources and requests. For instance, such shape analysis is commonly utilized within the biological sciences to evaluate, for example, changes in bone structures through evolution.

When the mathematical techniques are being applied within a two-dimensional model, relatively simple trigonometry may be utilized to understand the relationship between a requested target point and the plotted resources. Resources may be quantified as vectors within the two-dimensional (e.g., X, Y) space, that would define a point in space. A request may also be quantified as a point (or "bracket") within that two-dimensional space. Similarly, when applied to a three-dimensional space or N-dimensional space, a request may be quantified in terms of acceptable points or acceptable brackets within such space, and resources may be selected from within such acceptable points or acceptable brackets. As the number of dimensions increase (e.g., as the number of skills/attributes being quantified increases), the model may become more difficult to visualize, but the extension of mathematical techniques for measuring/evaluating the plotted values is known. For instance, as described above, examples of such N-dimensional modeling have been used in some prior art systems, such as voice and pattern recognition systems.

In resource management, such well-known mathematical techniques for N-dimensional modeling may be similarly utilized. When dealing with resources possessing non-homogenous skill sets, such as call center agents possessing varying skill levels of product knowledge, language, expertise in regulatory issues (e.g., in the pharmaceutical arena), as examples, each agent's skill level may be plotted within an N-dimensional space, resulting in volumes or a clustering of the agents according to their skill sets.

While the mathematical techniques necessary for quantifying resource skills/attributes are well known and such mathematical techniques have been applied in areas such as voice recognition, such mathematical techniques have not been effectively utilized within the field of resource management to improve allocation of resources to various requests. A preferred embodiment utilizes the mathematical techniques for managing resources (e.g., allocating resources to requests) in accordance with the above-described concept of an N-dimensional space. Such an N-dimensional space implementation preferably includes a queuing mechanism (e.g., a FIFO mechanism) for queuing requests that are awaiting service from a resource. Particularly as "N" becomes larger, the mathematics involved in calculating/plotting requests within the N dimensional space and performing distance measurements to determine the resources that are appropriate for servicing a request (e.g., resources relatively close to the plotted request) become very intensive, i.e., require a relatively large number of mathematical calculations. Thus, it may be difficult to perform the calculations in real-time (e.g., on the fly) in a timely manner.

Figure 7:
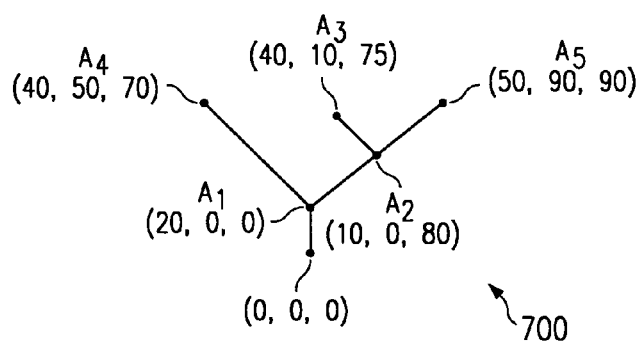
FIG. 7 shows an exemplary representation of resources as a bifurcating tree to enable quick searching of the tree to determine suitable resources for servicing a request.

The resource management system can be implemented in a variety of ways in an attempt to decrease the time required plotting requests within the N-dimensional space and/or calculating distance measurements to determine the appropriate resources to service the requests. One implementation may be to utilize a bifurcating tree to represent distance between the resources. Very fast searching techniques are known for determining resources within such a bifurcating tree that are appropriate for servicing a request. For instance, assume that agents of a call center are plotted within the N-dimensional space. Thereafter, a starting point may be determined (such as all vectors being zero, e.g., the value for each axis within the N-dimensional space being zero) and a bifurcating tree may be formed by performing distance measures from the starting point to the nearest agent, and then from that agent to the next agent, and so on. An example of such a bifurcating tree representation is shown in FIG. 7, in which five agents, $A_1$–$A_5$, are included. Bifurcating tree 700 of FIG. 7 represents the agents plotted within a hypothetical three-dimensional space (e.g., having X, Y, and Z coordinates). Thus, the agents each have three skills/attributes (corresponding to the X, Y, and Z coordinates) that are quantified. The exemplary tree 700 has a starting point or "base" of all vectors zero, i.e., (0, 0, 0). In the example of FIG. 7, agent $A_1$ has vector values (20, 0, 0), agent $A_2$ has vector values (10, 0, 80), agent $A_3$ has vector values (40, 10, 75), agent $A_4$ has vector values (40, 50, 70), and agent $A_5$ has vector values (50, 90, 90). As a result, agent $A_1$ is the nearest point to the starting point (0, 0, 0) of tree 700, followed by agents $A_2$–$A_5$ in order.

Utilizing a tree representation such as the exemplary tree 700, a very quick search may be performed with relatively little calculations involved to determine the appropriate agent for servicing a request. For example, in the implementation of FIG. 7, a quick determination may be made as to the nearest agent to starting point (0, 0, 0). Additionally, once it is determined that agent $A_1$ is the nearest agent to starting point (0, 0, 0), it may further be quickly determined the next nearest agent from agent $A_1$ (e.g., agent $A_2$). Furthermore, a relatively quick determination may be made as to the nearest appropriate agents for a request that plots to a point other than the starting point (0, 0, 0). For instance, suppose a request plots to value (15, 0, 0). A relatively quick determination may be made that agent $A_1$ is the closest agent to such request, and thereafter the next nearest agent (e.g., agent $A_2$) may be quickly determined by performing known searching techniques on the tree 700. The resources within a call center may be plotted to form the tree 700 at the beginning of a day or a work shift, as examples. Furthermore, the resources may periodically and/or continuously be updated within the tree 700 (e.g., throughout the day and/or shift). Thus, the resources may be plotted within a tree to enable binary search techniques (e.g., hashing techniques) or other fast selection methods to be applied to such tree in order to quickly select a resource suitable for servicing a request. The math-intensive task of plotting the resources in such a relational tree may be applied once (e.g., at the beginning of the work shift) or periodically, rather than performing such math-intensive operations in attempting to service every request received.

Accordingly, as shown in FIG. 7, the resources may be modeled as a bifurcated tree. Of course in alternative embodiments, the resources may be modeled in any of a various number of ways. As one example, the resources may be modeled as a table in which each of the resources have vector entries quantified as an address within such a table. Such a table form may then aid in performing relatively quick searches of the resources to determine appropriate resources for satisfying requests.

This invention is very good in the context of agent selection but you can also take it into general resource management where your resources may not be of a homogeneous type. If you can describe a resource in varying capabilities, for instance, in a network of processors of, let's say various speeds and configurations, a particular task comes in to be run in this highly distributed computing environment. This method could be applied to the selection of those. Anytime you have kind of gradational evaluation of a particular skill or capability, this method can be applied. The particular example is with agent selection in a call center but again, it has broader application.

While the above examples have focused on resource management within a call center, the present invention is applicable within many other resource management scenarios. For example, a network of IVR resources may be managed according to the principles of the present invention. For instance, certain skills of various IVR resources may be relatively uniform, such as their ability to play messages and detect DTMF signals. However, various IVR resources available within a network may also possess varying levels of other skills/attributes, such as varying levels of voice recognition capabilities. For example, a first type of IVR may include a voice recognizer that only recognizes "yes" and "no" responses. A second type of IVR may include a voice recognizer capable of recognizing numeric digits (e.g., 0–9). A third type of IVR may include a more complex voice recognizer that is capable of recognizing both numeric digits and simple responses, such as "yes," "no," "help," "cancel," and "terminate." Yet a fourth type of IVR may include a very complex voice recognizer that comprises a 50,000 word vocabulary, for example. The four IVR resources may all be considered as voice recognition resources. However, the gradational scheme of a preferred embodiment may be utilized to quantify the skills/ attributes of the IVR. For example, the first type of IVR resource that is capable of only recognizing "yes" and "no" responses may be plotted at one end of the scale, the second type of IVR may be plotted slightly higher on the scale, the third type of IVR may be plotted still higher on the scale, and the fourth type of IVR may be plotted at the high end of the scale. Of course, such plotting may be along one axis to indicate the extent of each IVR's vocabulary skills, while other attributes/skills of each IVR may be similarly plotted along other axes to quantify N attributes/skills within an N-dimensional space.

Thereafter, if particular type of IVR resource is needed for an application, one may be selected intelligently from the limited number of IVR resources. For example, if an application requires an IVR having the capability to recognize "yes" and "no" responses, such a request may be assigned the first type of IVR resource. If the first type of IVR resource is not available when needed, it may be determined that the next closes match to the desired type of IVR is the third type of IVR resource, which is capable of recognizing both numeric digits and simple responses, including "yes" and "no." If neither the first type nor the third type of IVR resources are available when needed, then the fourth type of IVR resource may be allocated to service the application's request (although, such an IVR resource possesses much more vocabulary skills than required by the application). Thus, by quantifying the skills/attributes of the IVR resources, a determination can be made as to the most appropriate IVR resources (e.g., the first and third types) to be utilized to satisfy the application's request, in order to better manage utilization of the IVR resources.

A further example of quantifying resources to manage allocation of such resources for servicing requests can be illustrated with reference to a retail chain. For instance, suppose a caller requests the address of the closest retail chain to such caller. The caller may provide a zip code, telephone number, or other information to indicate the caller's location, and then the nearest store may be calculated and returned to the caller. Now suppose that the caller requests the address of the nearest retail store that has a particular product in stock (e.g., a particular shirt having a particular size). Such attributes may then be plotted for the request within an N-dimensional space, as discussed above, to determine the most appropriate retail store. For instance, all of the retail stored could be maintaining inventory levels in real-time within a centralized computer system, and their varying inventory levels of particular products may cause such stores to be dynamically moving within the N-dimensional space. As yet a further example, the caller may request the address of the nearest store that has two particular products in stock. Thus, for instance, the caller may request the address of the nearest store that has a first particular type of product (e.g., a particular brand and particular size) in stock, and also has a second particular product in stock. All of the attributes of the customer's request may be plotted within the N-dimensional space, and the nearest store that meets all or most of the criteria may then be determined. Of course, certain attributes requested may be windowed or bracketed, such that a resource falling within the bracketed area is acceptable. For instance, only stores within a one hundred mile radius may be considered as suitable stores for servicing the caller.

Figure 8:
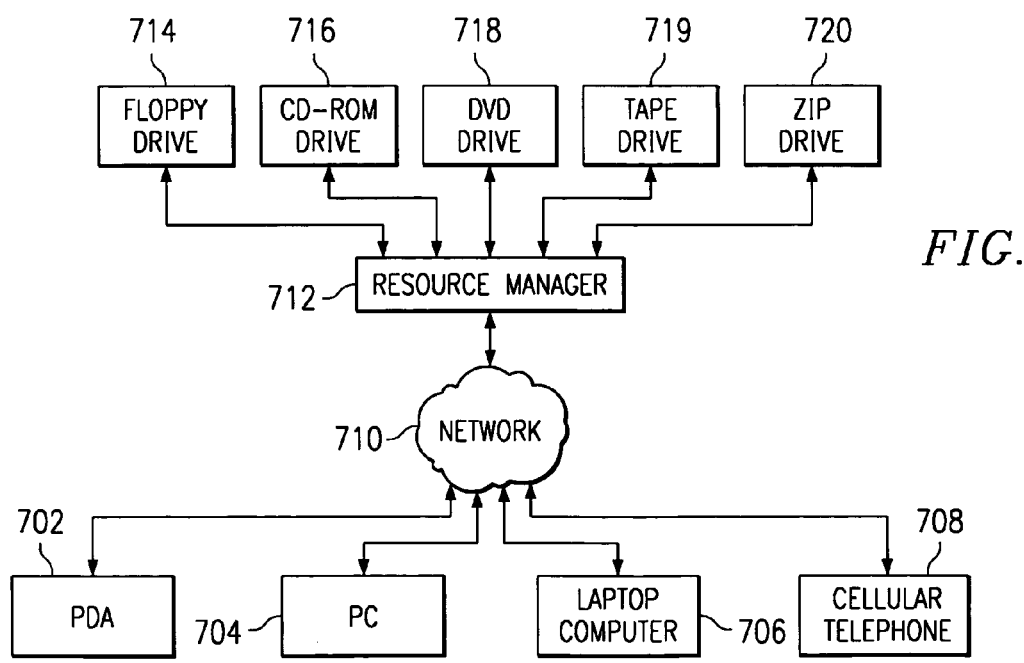
FIG. 8 shows an exemplary computer environment in which a resource management scheme of the present invention may be implemented to manage data storage resources to service data storage requests received from various types of devices.

The resource management scheme of the present invention is not intended to be limited to telephony resources, but may be applied equally to various other types of resources. For example, various types of computer resources may be quantified for better management in servicing requests. For instance, as shown in the exemplary implementation of FIG. 8, various types of data storage resources may be quantified to allow for better management of such resources in servicing requests from various types of devices. In the exemplary implementation of FIG. 8, various storage devices, such as floppy drive 714, CD-ROM drive 716, DVD drive 718, tape drive 719, and ZIP drive 720, may be included within a computer system. A resource manager 712 may be implemented to quantify skills/attributes of such storage devices, such as storage capacity, storage speed, retrieval speed, and/or other types of skills/attributes, in a manner similar to that described above for agents within a call center. One or more various types of devices that are capable of storing data to such data storage devices are also provided, such as Personal Data Assistant ("PDA") 702, personal computer ("PC") 704, laptop computer 706, and cellular telephone 708. Such devices may have a direct connection to resource manager 712, which enables communication of data therebetween, or they may be capable of communicating with resource manager 712 via Network 710, as shown in FIG. 8. Network 710 may comprise any means of information communication, such as a PSN, a proprietary network, a general purpose processor-based information network, dedicated communication lines, a satellite system, a cable system, a computer network, direct PC to PC connection, a local area network (LAN), a wide area network (WAN), modem to modem connection, the Internet, an Intranet or any combination thereof suitable for providing information communication between a particular device (or "network element") and the resource manager 712. Accordingly, when one or more of the devices 702, 704, 706, or 708 requests to store data, resource manager 712 may quantify the skills/ attributes of a storage device desired by such device, and attempt to allocate such request to the appropriate storage device 714, 716, 718, 719, or 720 that is quantified in a manner most closely matching such request.

As disclosed above, quantification of resources may be utilized to enable better allocation of such resources. Additionally, such quantification of resource skills/attributes may provide further advantages in the management of such resources. As one example, over a period of time, the types of requests received may be better understood. Therefore, the resources may be managed in an appropriate way to better service the most common types of requests received. As a further example, because the skills/attributes of the resources are quantified, such quantification provides a useful development tool. For instance, various types of reports and statistics on the resources may be generated based on such quantification of skills/attributes to aid in determining or defining adding further resources (e.g., defining hiring profiles to better match the work force to the types of requests commonly received) or training programs for the resources, as examples. The fact that the resource skill sets are quantified may provide an incredibly powerful management tool for training, hiring, and determining appropriate staffing levels, as examples, when used in conjunction with the quantified vectors of common requests. Thus, by quantifying requests, a more accurate customer profile may be developed. That is, the resource management system may be utilized to better determine what customers are commonly requesting. Accordingly, the resource manager may evaluate the quantified skills/attributes requested by customers and attempt to migrate the resource skills/attributes (e.g., through hiring and/or training) to match more closely to the customer requests. Prior art call centers typically include the functionality to generate reports detailing how long each agent talked on each call, how long the agents were busy, how long the agents were idle, etcetera. However, the quantification scheme of the present invention may be utilized to generate a more accurate or detailed view of the types of requests being received and the skills/attributes possessed by the resources responsible for servicing such requests.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing resources, said method comprising the steps of:
   providing a finite number of resources for servicing requests;
   quantifying, beyond mere binary quantification, "N" number of attributes of said resources, wherein N is at least one, thereby providing N number of quantified attributes;
   receiving at least one request for at least one of said resources;
   quantifying, beyond mere binary quantification, at least one attribute desired by said at least one request, thereby providing a quantified at least one attribute desired by said at least one request;
   based at least in part on said quantifying steps, determining at least one suitable resource for servicing said at least one request; and
   plotting said "N" number of quantified attributes within an N-dimensional space.

2. The method of claim 1 wherein said resources include agents within a telephony call center.

3. The method of claim 1 wherein said at least one request includes a request from a caller to a telephony center.

4. The method of claim 1 wherein said resources include resources within a computer system.

5. The method of claim 4 wherein said resources include resources selected from the group consisting of: data input resources, data output resources, data storage resources, and data processing resources.

6. The method of claim 1 wherein said step of quantifying "N" number of attributes of said resources further includes:
   quantifying two or more attributes of said resources.

7. The method of claim 1 further including the step of:
   plotting said quantified at least one attribute desired by said at least one request within said N-dimensional space.

8. The method of claim 7 wherein said determining step includes:
   calculating the distance between said "N" number of quantified attributes of said resources and said quantified at least one attribute desired by said at least one request to determine at least one suitable resource for servicing said at least one request.

9. The method of claim 1 wherein said determining step includes:
   determining said at least one suitable resource from resources then available to immediately service said at least one request.

10. The method of claim 1 wherein said determining step includes:
    determining said at least one suitable resource from all of said resources.

11. The method of claim 1 wherein said at least one attribute includes at least one skill possessed by said resources.

12. The method of claim 1 wherein said at least one attribute includes at least one functional capability possessed by said resources.

13. The method of claim 1 wherein said quantifying beyond mere binary quantification, "N" number of attributes of said resources further includes:
    grading said "N" number of attributes of each of said resources along a scale.

14. The method of claim 13 wherein said scale is of 0 to 100.

15. The method of claim 1 wherein said quantifying at least one attribute desired by said at least one request further includes:
    grading said at least one attribute of each of said resources along a scale.

16. The method of claim 15 wherein said scale is of 0 to 100.

17. The method of claim 1 wherein said quantifying at least one attribute desired by said at least one request comprises utilizing at least one selected from the group consisting of:
    demographics information, a profile for a requester, and interactive voice response (IVR) interaction with the requestor.

18. The method of claim 1 wherein said receiving at least one request for at least one of said resources comprises:
    receiving a target value of said at least one attribute desired by said at least one request and a close_match modifier that indicates the closeness of said N number of quantified attributes of said resources to the target value that is suitable for servicing said at least one request.

19. The method of claim 1 wherein said quantifying at least one attribute desired by said at least one request comprises using information in a profile for a requestor of said at least one of said resources for performing said quantifying for a request from said requestor.

20. A method of allocating resources selected from a finite number of resources for servicing requests, said resources having at least one measurable functional attribute, said method comprising the steps of:
    quantifying "N" number of functional attributes of said resources, thereby resulting in N number of quantified functional attributes, wherein N is at least one and wherein said quantifying said N functional attributes of said resources includes grading said N functional attributes of each of said resources along a scale having more than binary grades;
    plotting said N number of quantified functional attributes within an N-dimensional space;
    receiving at least one request for at least one of said N functional attributes;

quantifying said at least one of said N functional attributes desired by said at least one request, thereby resulting in quantified at least one of said N functional attributes desired by said at least one request, wherein said quantifying said at least one of said N functional attributes desired by said at least one request includes grading said at least one of said N functional attributes of each of said resources along a scale having more than binary grades; and based at least in part on said quantifying steps, determining at least one suitable resource for servicing said at least one request.

21. The method of claim 20 wherein said resources include agents within a telephony call center.

22. The method of claim 20 wherein said at least one request includes a request from a caller to a telephony center.

23. The method of claim 20 wherein said resources include resources within a computer system.

24. The method of claim 23 wherein said resources include resources selected from the group consisting of: data input resources, data output resources, data storage resources, and data processing resources.

25. The method of claim 20 wherein said step of quantifying N number of functional attributes of said resources further includes:
   quantifying two or more functional attributes of said resources.

26. The method of claim 20 further including the step of:
   plotting said quantified at least one of said N functional attributes desired by said at least one request within said N-dimensional space.

27. The method of claim 26 wherein said determining step includes:
   calculating the distance between said "N" number of quantified functional attributes of said resources and said quantified at least one of said N functional attributes desired by said at least one request to determine at least one suitable resource for servicing said at least one request.

28. The method of claim 20 wherein said determining step includes:
   determining said at least one suitable resource from resources then available to immediately service said at least one request.

29. The method of claim 20 wherein said determining step includes:
   determining said at least one suitable resource from all of said resources.

30. The method of claim 20 wherein said N number of functional attributes includes at least one skill possessed by said resources.

31. The method of claim 20 wherein said scale is of 0 to 100.

32. The method of claim 20 wherein said scale is of 0 to 100.

33. The method of claim 20 wherein said quantifying said at least one of said N functional attributes desired by said at least one request comprises using information in a profile for a requester of said at least one of said N functional attributes for performing said quantifying for a request from said requestor.

34. The method of claim 20 wherein said receiving at least one request for said at least one of said N functional attributes comprises:
   receiving a target value of said at least one of said N functional attributes desired by said at least one request and a close_match modifier that indicates the closeness of said N number of quantified functional attributes of said resources to the target value that is suitable for servicing said at least one request.

35. The method of claim 20 further comprising wherein said receiving at least one request for said at least one of said N functional attributes comprises:
   receiving a close_match modifier that indicates how close said N number of quantified functional attributes of said resources has to be to said quantified at least one of said N functional attributes desired by said at least one request in order to be suitable for servicing said at least one request.

36. A resource management system for managing a finite number of resources for servicing requests, said resource management system comprising:
   means for gradationally quantifying "N" number of attributes of said resources, thereby resulting in N number of quantified attributes, wherein N is at least one and wherein said means for gradationally quantifying N number of attributes of said resources further includes means for grading said N number of attributes of each of said resources along a scale that includes more than two grades;
   means for plotting said N number of quantified attributes within an N-dimensional space;
   means for receiving at least one request for at least one of said resources;
   means for gradationally quantifying at least one attribute desired by said at least one request, thereby resulting in a quantified at least one attribute desired by said at least one request, wherein said means for gradationally quantifying at least one attribute desired by said at least one request further includes means for grading said at least one attribute of each of said resources along a scale that includes more than two grades; and
   means for determining at least one suitable resource for servicing said at least one request based at least in part on the N number of quantified attributes of said resources and said quantified at least one attribute desired by said at least one request, wherein said means for determining computes a difference between the quantified N number of attributes of said resources and the quantified at least one attribute desired by said at least one request to identify at least one of said resources that is suitable for servicing said at least one request.

37. The system of claim 36 wherein said means for gradationally quantifying N number of attributes of said resources includes a computer processor executing computer software code.

38. The system of claim 36 wherein said means for gradationally quantifying at least one attribute desired by said at least one request includes a computer processor executing computer software code.

39. The system of claim 36 wherein said determining means includes a computer processor executing computer software code.

40. The system of claim 36 wherein said receiving means includes a connection to a network.

41. The system of claim 40 wherein said network is selected from the group consisting of:
   public switched telephony network (PSTN), local area network (LAN), wide area network (WAN), the Internet, an Intranet, or any combination thereof.

42. The system of claim 36 wherein said receiving means includes a switching system.

43. The system of claim 42 wherein said switching system includes an ACD/PBX.

44. The system of claim 36 wherein said resources include agents within a telephony call center.

45. The system of claim 36 wherein said at least one request includes a request from a caller to a telephony center.

46. The system of claim 36 wherein said resources include resources within a computer system.

47. The system of claim 46 wherein said resources include resources selected from the group consisting of: data input resources, data output resources, data storage resources, and data processing resources.

48. The system of claim 36 wherein said means for gradationally quantifying at least one attribute desired by said at least one request further includes:
means for plotting said quantified at least one attribute desired by said at least one request within said N-dimensional space.

49. The system of claim 48 wherein said determining means includes:
means for calculating the distance between said "N" number of quantified attributes of said resources and said quantified at least one attribute desired by said at least one request to determine at least one suitable resource for servicing said at least one request.

50. The system of claim 36 wherein said determining means includes:
means for determining said at least one suitable resource from resources then available to immediately service said at least one request.

51. The system of claim 36 wherein said determining means includes:
means for determining said at least one suitable resource from all of said resources.

52. The system of claim 36 wherein said N number of attributes includes at least one skill possessed by said resources.

53. The system of claim 36 wherein said N number of attributes includes at least one functional capability possessed by said resources.

54. The system of claim 36 wherein said scale is of 0 to 100.

55. The system of claim 36 wherein said scale is of 0 to 100.

56. A resource management system for managing a finite number of resources for servicing requests, said system comprising:
connection to a network capable of receiving at least one request for at least one of said resources;
memory for storing computer executable program code, wherein said computer executable program code includes code executable to quantify at least one attribute of said resources by assigning any of more than two quantifications to said at least one attribute of said resources, code executable to quantify at least one attribute desired by said at least one request by assigning any of more than two quantifications to said at least one attribute desired by said at least one request, and code executable to determine at least one suitable resource for servicing said at least one request based at least in part on said at least one quantified attribute of said resources and said at least one quantified attribute desired by said at least one request;
wherein said code executable to quantify at least one attribute of said resources further includes code executable to quantify "N" number of attributes of said resources wherein N is at least one, thereby providing quantified "N" number of attributes, and code executable to plot said quantified "N" number of attributes within an N-dimensional space;
wherein said code executable to quantify at least one attribute desired by said at least one request, thereby providing quantified at least one attribute desired by said at least one request, further includes code executable to plot said quantified at least one attribute desired by said at least one request within said N-dimensional space;
wherein said code executable to determine at least one suitable resource includes code executable to calculate the distance between said quantified "N" number of attributes of said resources and said quantified at least one attribute desired by said at least one request to determine at least one suitable resource for servicing said at least one request; and
processor for executing said computer executable program code.

57. The system of claim 56 wherein said network is selected from the group consisting of:
public switched telephony network (PSTN), local area network (LAN), wide area network (WAN), the Internet, an Intranet, or any combination thereof.

58. The system of claim 56 wherein said connection to a network includes a switching system.

59. The system of claim 58 wherein said switching system includes an ACD/PBX.

60. The system of claim 56 wherein said resources include agents within a telephony call center.

61. The system of claim 56 wherein said at least one request includes a request from a caller to a telephony center.

62. The system of claim 56 wherein said resources include resources within a computer system.

63. The system of claim 62 wherein said resources include resources selected from the group consisting of: data input resources, data output resources, data storage resources, and data processing resources.

64. The system of claim 56 wherein said code executable to determine at least one suitable resource includes:
code executable to determine said at least one suitable resource from resources then available to immediately service said at least one request.

65. The system of claim 56 wherein said code executable to determine at least one suitable resource includes:
code executable to determine said at least one suitable resource from all of said resources.

66. The system of claim 56 wherein said at least one attribute includes at least one skill possessed by said resources.

67. The system of claim 56 wherein said at least one attribute includes at least one functional capability possessed by said resources.

68. The system of claim 56 wherein said code executable to quantify at least one attribute of said resources further includes:
code executable to grade said at least one attribute of each of said resources along a scale.

69. The system of claim 68 wherein said scale is of 0 to 100.

70. The system of claim 56 wherein said code executable to quantify at least one attribute desired by said at least one request further includes:
code executable to grade said at least one attribute of each of said resources along a scale.

71. The system of claim 70 wherein said scale is of 0 to 100.

* * * * *